US012663513B2

(12) United States Patent
Park et al.

(10) Patent No.: US 12,663,513 B2
(45) Date of Patent: Jun. 23, 2026

(54) METHOD AND APPARATUS OF FILTERING DYNAMIC OBJECTS IN RADAR-BASED EGO-EMOTION ESTIMATION

(71) Applicant: ELECTRONICS AND TELECOMMUNICATIONS RESEARCH INSTITUTE, Daejeon (KR)

(72) Inventors: Yeong Sang Park, Daejeon (KR); Kyoung-Wook Min, Daejeon (KR); Jeong Dan Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 366 days.

(21) Appl. No.: 18/487,276

(22) Filed: Oct. 16, 2023

(65) Prior Publication Data

US 2024/0134009 A1 Apr. 25, 2024
US 2024/0230842 A9 Jul. 11, 2024

(30) Foreign Application Priority Data

Oct. 24, 2022 (KR) ........................ 10-2022-0137693
Aug. 22, 2023 (KR) ........................ 10-2023-0109618

(51) Int. Cl.
G01S 7/41 (2006.01)
G01S 13/50 (2006.01)

(52) U.S. Cl.
CPC .............. G01S 7/417 (2013.01); G01S 7/415 (2013.01); G01S 13/50 (2013.01)

(58) Field of Classification Search
CPC ........... G01S 7/417; G01S 7/415; G01S 13/50
See application file for complete search history.

(56) References Cited

U.S. PATENT DOCUMENTS 10,785,083 B2 9/2020 Kim
2007/0171396 A1* 7/2007 Harris ..................... G01S 17/95
356/28

(Continued)

FOREIGN PATENT DOCUMENTS

JP 2020-3337 A 1/2020
JP 6818541 B2 1/2021

(Continued)

OTHER PUBLICATIONS

Dominik Kellner et al., "Instantaneous Ego-Motion Estimation using Doppler Radar", Proceedings of the 16th International IEEE Annual Conference on Intelligent Transportation Systems (ITSC 2013), The Hague, The Netherlands, Oct. 6-9, 2013.

*Primary Examiner* — William Kelleher
*Assistant Examiner* — Hailey R Le
(74) *Attorney, Agent, or Firm* — LRK PATENT LAW FIRM

(57) ABSTRACT

A method of filtering dynamic objects in radar-based ego-motion estimation includes converting measurement value at current time, measured by radar sensor, into point cloud, classifying the point cloud into points of a first object predicted as static object and points of a second object predicted as dynamic object, based on position value of dynamic object tracked at previous time, classifying the points of the first object into the points of the static object predicted as normal value and the points of the dynamic object predicted as outlier, based on outlier filtering algorithm, classifying the points of the second object into points of a candidate static object and points of a candidate dynamic object, based on velocity model of the static object, and tracking a position value of the dynamic object at current time, based on the points of the dynamic object and the points of the candidate dynamic object.

16 Claims, 4 Drawing Sheets

(56) References Cited

U.S. PATENT DOCUMENTS

| | | | | |
|---|---|---|---|---|
| 2013/0093617 A1* | 4/2013 | Christopher | .......... | G01S 7/2923 |
| | | | | 342/146 |
| 2019/0361116 A1 | 11/2019 | Lee | | |
| 2019/0369222 A1* | 12/2019 | Oh | ........................ | G01S 13/931 |
| 2020/0218913 A1* | 7/2020 | Unnikrishnan | ....... | G01S 13/867 |
| 2022/0018956 A1* | 1/2022 | Jung | ..................... | G01S 7/2883 |
| 2022/0196828 A1* | 6/2022 | Sorrentino | ............ | G01S 13/876 |
| 2022/0207760 A1* | 6/2022 | Braley | .................. | G06V 20/56 |
| 2023/0184932 A1* | 6/2023 | Leßmann | ................ | G01S 13/52 |
| | | | | 342/70 |

FOREIGN PATENT DOCUMENTS

| | | | |
|---|---|---|---|
| JP | 2021-109616 A | 8/2021 |
| KR | 10-1628155 B1 | 6/2016 |
| KR | 10-2019-0129622 A | 11/2019 |
| KR | 10-2085910 B1 | 3/2020 |

* cited by examiner

FIG. 4

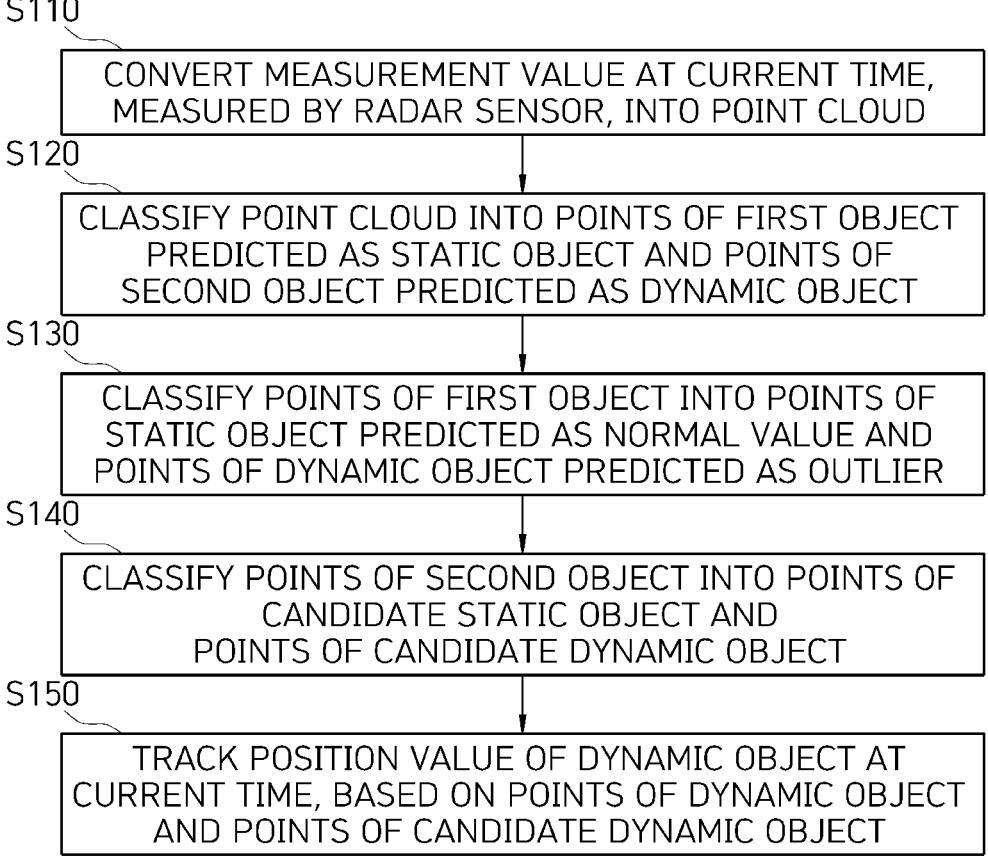

S110

CONVERT MEASUREMENT VALUE AT CURRENT TIME,
MEASURED BY RADAR SENSOR, INTO POINT CLOUD

S120

CLASSIFY POINT CLOUD INTO POINTS OF FIRST OBJECT
PREDICTED AS STATIC OBJECT AND POINTS OF
SECOND OBJECT PREDICTED AS DYNAMIC OBJECT

S130

CLASSIFY POINTS OF FIRST OBJECT INTO POINTS OF
STATIC OBJECT PREDICTED AS NORMAL VALUE AND
POINTS OF DYNAMIC OBJECT PREDICTED AS OUTLIER

S140

CLASSIFY POINTS OF SECOND OBJECT INTO POINTS OF
CANDIDATE STATIC OBJECT AND
POINTS OF CANDIDATE DYNAMIC OBJECT

S150

TRACK POSITION VALUE OF DYNAMIC OBJECT AT
CURRENT TIME, BASED ON POINTS OF DYNAMIC OBJECT
AND POINTS OF CANDIDATE DYNAMIC OBJECT

METHOD AND APPARATUS OF FILTERING DYNAMIC OBJECTS IN RADAR-BASED EGO-EMOTION ESTIMATION

CROSS-REFERENCE TO RELATED APPLICATIONS

This application claims the benefit of the Korean Patent Application No. 10-2022-0137693 filed on Oct. 24, 2022, and 10-2023-0109618 filed on Aug. 22, 2023, which are hereby incorporated by reference as if fully set forth herein.

BACKGROUND

1. Field of the Invention

The present invention relates to radar-based ego-motion estimation technology, and more particularly, to ego-motion estimation technology based on radar for autonomous driving.

2. Description of Related Art

An ego-motion denotes the three-dimensional movement of sensors such as a camera, LiDAR, and radar in an environment, and ego-motion estimation denotes an operation of estimating the three-dimensional movement of a sensor, based on pieces of time-series data measured by the sensor.

Radar is a sensor which is mainly used in the recognition of peripheral objects fundamentally. Radar, like LiDAR, may measure a distance to a peripheral object, but because accuracy is low and measurement data is sparse, radar is not generally used in ego-motion estimation. Also, because ego-motion estimation using radar tracks (recognizes) static objects unlike a conventional method of tracking (recognizing) dynamic objects, this does not match a characteristic of radar, and due to this, research on radar-based ego-motion estimation is not activated.

However, with the advance of sensors, the accuracy and density of data measured by radar have progressively increased, and because radar sensors may measure a Doppler velocity, research for using radar sensors in ego-motion estimation is being done.

Conventional research for estimating an ego-motion by using a Doppler velocity applies an outlier filtering algorithm such as random sample consensus (RANSAC) or Cauchy norm, and thus, is based on the assumption that dynamic objects representing an outlier are completely removed. However, when a ratio, occupied by data of a dynamic object, of data measured by a radar sensor is higher than a ratio occupied by a static object, there may be a case where a conventional outlier filtering algorithm does not completely remove data of a dynamic object. In this case, there is a problem where the reliability of static object recognition is reduced, namely, the reliability of radar-based ego-motion estimation is reduced.

SUMMARY

An aspect of the present invention is directed to providing a dynamic object filtering method and apparatus for robustly filtering (removing) a dynamic object so as to increase the reliability of static object recognition in a process of estimating a radar-based ego-motion.

To achieve these and other advantages and in accordance with the purpose of the invention, as embodied and broadly described herein, there is provided a method of filtering dynamic objects in radar-based ego-motion estimation, the method including: converting a measurement value at a current time, measured by a radar sensor, into a point cloud by using a data converter; classifying the point cloud into points of a first object predicted as a static object and points of a second object predicted as a dynamic object by using a pre-filter, based on a position value of a dynamic object tracked at a previous time by a track module; classifying the points of the first object into the points of the static object predicted as a normal value and the points of the dynamic object predicted as an outlier by using an outlier filter, based on an outlier filtering algorithm; classifying the points of the second object into points of a candidate static object and points of a candidate dynamic object by using a post-filter, based on a velocity model of the static object; and tracking a position value of the dynamic object at a current time by using the track module, based on the points of the dynamic object and the points of the candidate dynamic object.

In another aspect of the present invention, there is provided an apparatus for filtering dynamic objects in radar-based ego-motion estimation, the apparatus including: a data converter configured to convert a measurement value at a current time, measured by a radar sensor, into a point cloud; a pre-filter configured to classify the point cloud into points of a first object predicted as a static object and points of a second object predicted as a dynamic object, based on a position value of a dynamic object tracked at a previous time by a track module; an outlier filter configured to classify the points of the first object into the points of the static object predicted as a normal value and the points of the dynamic object predicted as an outlier, based on an outlier filtering algorithm; a post-filter configured to classify the points of the second object into points of a candidate static object and points of a candidate dynamic object, based on a velocity model of the static object; and the track module configured to track a position value of the dynamic object at a current time, based on the points of the dynamic object and the points of the candidate dynamic object.

It is to be understood that both the foregoing general description and the following detailed description of the present invention are exemplary and explanatory and are intended to provide further explanation of the invention as claimed.

BRIEF DESCRIPTION OF THE DRAWINGS

FIG. 4 is a flowchart for describing a method of filtering dynamic objects in radar-based ego-motion estimation according to an embodiment of the present invention.

DETAILED DESCRIPTION OF THE INVENTION

Hereinafter, example embodiments of the invention will be described in detail with reference to the accompanying drawings. In describing the invention, to facilitate the entire understanding of the invention, like numbers refer to like elements throughout the description of the figures, and a repetitive description on the same element is not provided.

In the following description, the technical terms are used only for explain a specific exemplary embodiment while not limiting the present invention. The terms of a singular form may include plural forms unless referred to the contrary. The meaning of 'comprise', 'include', or 'have' specifies a property, a region, a fixed number, a step, a process, an element and/or a component but does not exclude other properties, regions, fixed numbers, steps, processes, elements and/or components.

Figure 1:
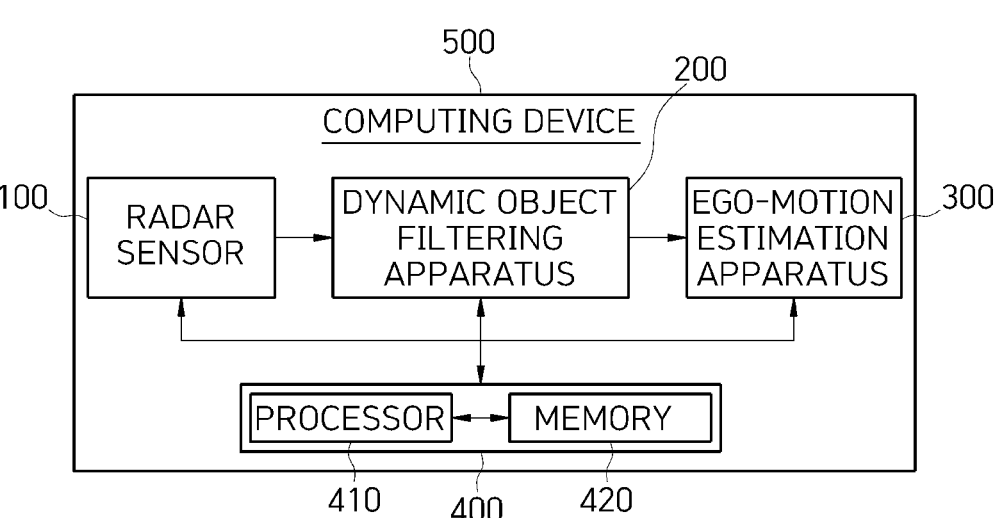
FIG. 1 is a schematic block diagram of a computing device according to an embodiment of the present invention.

FIG. 1 is a schematic block diagram of a computing device 500 according to an embodiment of the present invention.

Referring to FIG. 1, the computing device 500 according to an embodiment of the present invention may be an apparatus which estimates a radar-based ego-motion and may be equipped in various mobile apparatuses (for example, general, vehicles, autonomous driving vehicles, ships, aircrafts, and unmanned planes (for example, drones)) capable of being equipped with a radar sensor.

The computing device 500 may robustly track and filter a dynamic object to provide a high static object recognition rate, and thus, may provide the high reliability of radar-based ego-motion estimation.

To this end, the computing device 500 may include a radar sensor 100, a dynamic object filtering apparatus 200, and an ego-motion estimation apparatus 300 and may further include a dedicated chip 410 which controls the operations and/or execution of the elements 100, 200, and 300. Here, the dedicated chip 410 may be a system on chip (SoC), a microcontroller unit (MCU), and an application processor (AP). The dedicated chip 410 may fundamentally include at least one processor 410 and at least one memory 420. The at least one processor 410 may include at least one central processing unit (CPU) and at least one graphics processing unit (GPU). The memory 420 may include a volatile memory and a non-volatile memory.

The radar sensor 100 may transmit a radar signal and may collect a measurement value of a signal reflected to an object (including a static object and a dynamic object).

Each of the dynamic object filtering apparatus 200 and the ego-motion estimation apparatus 300 may be implemented as a chip, without the control of the dedicated chip 400. In this case, each of the dynamic object filtering apparatus 200 and the ego-motion estimation apparatus 300 may autonomously include a processor. Also, the dynamic object filtering apparatus 200 and the ego-motion estimation apparatus 300 may be integrated into one chip, and an integrated chip may be embedded in the dedicated chip 400.

The dynamic object filtering apparatus 200 may analyze a measurement value of an object (including a static object and a dynamic object) measured by the radar sensor 100 to robustly filter data of the dynamic object, and thus, may provide the ego-motion estimation apparatus 300 with accurate data of the static object.

The dynamic object filtering apparatus 200 may filter the dynamic object representing an outlier from the measurement value measured by the radar sensor 100, based on an outlier filtering algorithm such as random sample consensus (RANSAC) or Cauchy norm. At this time, the dynamic object filtering apparatus 200 may robustly filter the dynamic object through two filtering processes which include a pre-filtering process performed before a filtering process by the outlier filtering algorithm and a post-filtering process performed after a filtering process by the outlier filtering algorithm.

The ego-motion estimation apparatus 300 may estimate an ego-motion including a Doppler velocity and a heading angle of the radar sensor 100, based on data of a static object having high reliability input from the dynamic object filtering apparatus 200, and thus, may largely enhance the reliability of ego-motion estimation of the radar sensor 100.

Figure 2:
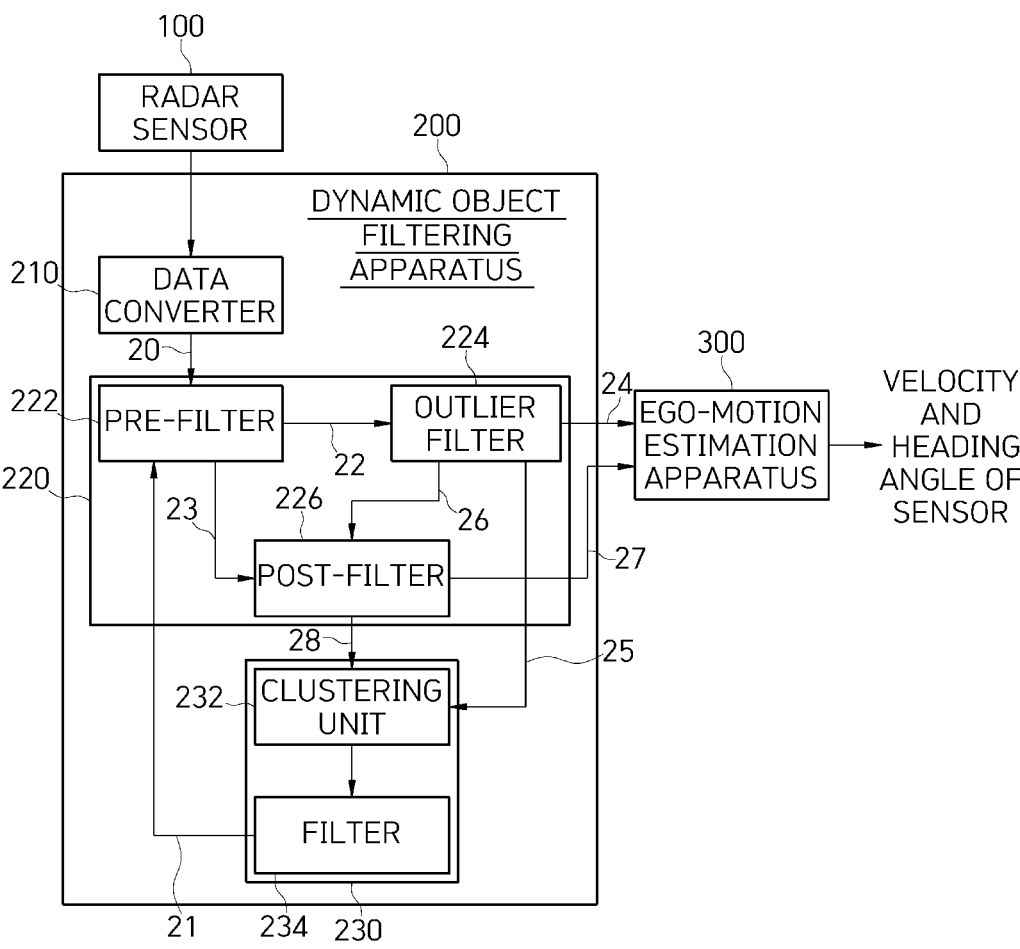
FIG. 2 is a diagram for describing a detailed configuration of a dynamic object filtering apparatus of FIG. 1.
Figure 3:
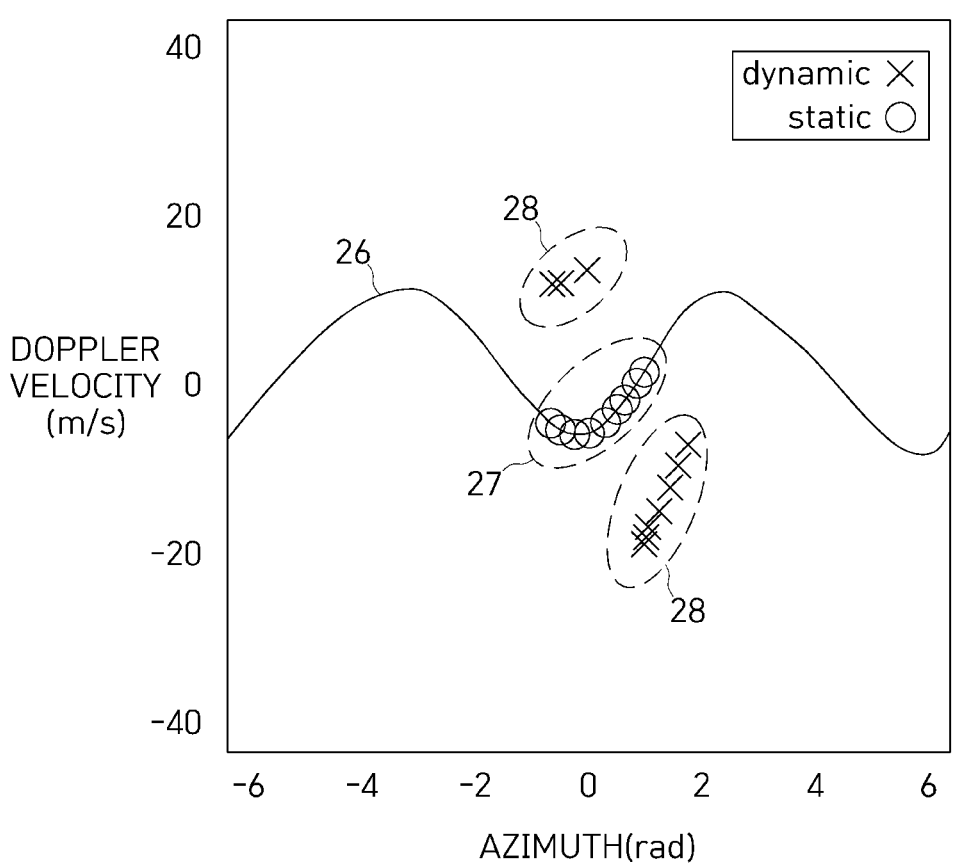
FIG. 3 is a diagram for describing a velocity model of a static object generated by an outlier filter of FIG. 2.

FIG. 2 is a diagram for describing a detailed configuration of the dynamic object filtering apparatus 200 of FIG. 1. FIG. 3 is a diagram for describing a velocity model of a static object generated by an outlier filter 224 of FIG. 2.

Referring to FIG. 2, the dynamic object filtering apparatus 200 may include a data converter 210, a filtering module 220, and a track module 230.

The data converter 210 may convert a current-time measurement value of an object, measured by the radar sensor 100, into a point cloud 20. Here, the object may include a static object and a dynamic object. The point cloud 20 may denote a set of data representing points distributed in a cloud shape in a three-dimensional (3D) space.

The measurement value of the radar sensor 100 may be represented by, for example, $X=\{r, \theta, v_r\}$. Here, r may denote a distance from the radar sensor 100 to the object, $\theta$ may denote an azimuth of the object, and $v_r$ may denote a Doppler velocity of the object. When the Doppler velocity is expressed as an equation, the Doppler velocity may be expressed as $v_r=v_x \cos(\theta)+v_y \sin(\theta)$. Here, in a radar sensor coordinate system, $v_x$ may denote a velocity vector in an x-axis direction, and $v_y$ may denote a velocity vector in a y-axis direction.

One point p converted from the measurement value of the radar sensor 100 may be represented by $p=\{x, y, v_r\}=\{r \cos(\theta), r \sin(\theta), v_r\}$. The point cloud 20 or points converted from the measurement value of the radar sensor 100 in unit scan may be represented by $P=\{p_1, p_2, \ldots, p_n\}$.

In FIG. 1, the data converter 210 may be included in the dynamic object filtering apparatus 200, but is not limited thereto and may be included in the radar sensor 100. In this case, the data converter 210 may be deleted from the dynamic object filtering apparatus 200.

The filtering module 220 may filter the dynamic object in the object measured by the radar sensor at a current time, based on a position value of the dynamic object tracked (recognized) at an initial time or a previous time in the track module 230.

In detail, the filtering module 220 may include a pre-filter 222 which performs pre-filtering on the point cloud 20 input from the data converter 210, an outlier filter 224 which performs outlier filtering on a pre-filtering result of the pre-filter 222, and a post-filter 226 which performs post-filtering on an outlier filtering result of the outlier filter 224.

In detail, the pre-filter 222 may perform pre-filtering which classifies the point cloud 20 into points of a first object 22 predicted as a static object and points of a second object 23 predicted as a dynamic object, based on a position value 21 of the dynamic object tracked by the track module 230 at an initial time or a previous time.

In an embodiment, the pre-filter 222 may classify, into the points of the second object 23, points located in a previously set radius among points of the point cloud 20 with respect to the position value 21 of the dynamic object tracked at the previous time in the 3D space and may classify the other points into the points of the first object 22.

The points of the second object 23 may be points located in a previously set radius with respect to the position value 21 of the dynamic object tracked at the previous time, and thus, may be predicted as a dynamic object which is at a current time. On the other hand, the points of the first object 22 may be points located outside the radius, and thus, may be predicted as a static object which is at the current time.

However, it may not be expected that a dynamic object at a current time and a static object at a current time are completely classified by the pre-filtering by the pre-filter 222. That is, there may be points of a static object in the points of the second object 23, and moreover, there may be points of a dynamic object in the points of the first object 22.

Therefore, in the present embodiment, the post-filter 226 may perform post-filtering which classifies the points of the second object 23, predicted as the dynamic object by the pre-filter 222, into points of a dynamic object (a candidate dynamic object described below) and points of a static object (a candidate static object described below) once more. Also, the outlier filter 224 may perform outlier-filtering which classifies the points of the first object 22, predicted as the static object by the pre-filter 222, into points of a static object predicted as a normal value and points of a dynamic object predicted as an outlier once more.

The outlier filter 224 may classify the points of the first object 22 into points of a static object 24 predicted as a normal value and points of a dynamic object 25 predicted as an outlier, based on the outlier filtering algorithm.

In an embodiment, the outlier filtering algorithm may be, for example, random sample consensus (RANSAC).

In an embodiment, the outlier filter 224 may further perform a process of generating a velocity model of the static object 26, based on the points of the static object 24 predicted as the normal value.

In an embodiment, as illustrated in FIG. 3, the velocity model of the static object 26 may include a sinusoidal curve shown in a graph which includes an x axis representing an azimuth of the static object and a y axis representing a Doppler velocity of the static object.

An ego-motion of the radar sensor 100 may have a size equal to a velocity vector of a static object measured by the radar sensor 100 and may have a vector in an opposite direction, and thus, when an object measured by the radar sensor 100 is a static object, a Doppler velocity of the static object may be a sum of a sine function and a cosine function as in Equation "$v_r = v_x \cos(\theta) + v_y \sin(\theta)$" described above, and thus, the static object may be modeled as a curve which is changed to a sinusoidal form with respect to an azimuth $\theta$.

The post-filter 226 may perform post-filtering which classifies the points of the second object 23, classified by the pre-filter 222, into points of a candidate static object 27 and points of a candidate dynamic object 28, based on the velocity model of the static object 26 generated by outlier filter 224.

In an embodiment, as illustrated in FIG. 3, the post-filter 226 may perform post-filtering which classifies points, fitted to a sinusoidal curve shown in the velocity model of the static object 26 among the points of the second object 23 classified in the pre-filter 222, into the points of the candidate static object 27. That is, the post-filter 226 may classify points, which are located in the sinusoidal curve or are within a certain error range among the points of the second object 23, into the points of the candidate static object 27. Here, the certain error range may include an error range of an azimuth with respect to the sinusoidal curve and/or an error range of a Doppler velocity, and based on a design, may be variously set.

In an embodiment, as illustrated in FIG. 3, the post-filter 226 may perform post-filtering which classifies points, which are not fitted to a sinusoidal curve among the points of the second object 23 classified in the pre-filter 222, into the points of the candidate dynamic object 28. That is, the post-filter 226 may classify points, which are not located in the sinusoidal curve or are outside the certain error range among the points of the second object 23, into the points of the candidate dynamic object 28.

The track filter 230 may track a position value of the dynamic object at a current time, based on the points of the dynamic object 25 and 28 filtered (classified) through the pre-filtering, the outlier filtering, and the post-filtering by the filtering module 220. To this end, the track module 230 may include a clustering unit 232 and a filter 234.

The clustering unit 232 may perform a process of clustering the points of the dynamic object 25 classified (filtered) by the outlier filter 224 and the points of the candidate dynamic object 28 classified (filtered) by the post-filter 226, based on a clustering algorithm, and recognizing the clustered points as the dynamic object.

In an embodiment, the clustering algorithm may be, for example, density-based spatial clustering of applications with noise (DBSCAN).

The filter 234 may perform a process of tracking the recognized position value of the dynamic object at the current time, based on a Gaussian mixture model corresponding to the recognized dynamic object.

In an embodiment, the filter 234 may express the recognized dynamic object as the Gaussian mixture model, and then, may perform a pruning process on the clustered points representing the dynamic object expressed as the Gaussian mixture model and may perform a process of removing points corresponding to noise. Subsequently, the filter 234 may calculate a probability hypothesis density (PHD) by using a mixture of Gaussian components of the clustered points from which the noise has been removed and may perform a process of estimating the position value of the dynamic object at the current time, based on the calculated probability hypothesis density.

In an embodiment, the filter 234 may be a Gaussian mixture probabilistic hypothesis density (GMPHD) filter.

Furthermore, the ego-motion estimation apparatus 300 may perform a process of estimating an ego-motion including the Doppler velocity and the heading angle of the radar sensor, based on the points of the static object 24 and the points of the candidate static object 27.

In an embodiment of the present invention, based on the pre-filtering by the pre-filter 222, the outlier filtering by the outlier filter 224, and the post-filtering by the post-filter 230, the dynamic object may be robustly filtered, and the points of the candidate static object 27 in addition to the points of the static object 24 may be additionally recognized. Accordingly, because the ego-motion estimation apparatus 300 estimates an ego-motion on the basis of the points of the static object 24 and the points of the candidate static object 27, the reliability of the ego-motion estimation of the radar sensor 100 may be largely enhanced.

FIG. 4 is a flowchart for describing a method of filtering dynamic objects in radar-based ego-motion estimation according to an embodiment of the present invention.

Referring to FIG. 4, first, in step S110, a process of converting a measurement value at a current time, measured by the radar sensor 100, into the point cloud 20 may be performed by the data converter 210.

Subsequently, in step S120, a process of classifying the point cloud 20 into the points of the first object 22 predicted as a static object and the points of the second object 23 predicted as a dynamic object on the basis of the position value of the dynamic object 21 tracked at a previous time by the track module 230 may be performed by the pre-filter 222.

Subsequently, in step S130, a process of classifying the points of the first object 22 into the points of the static object 24 predicted as a normal value and the points of the dynamic object 25 predicted as an outlier on the basis of the outlier filtering algorithm may be performed by the outlier filter 224.

Subsequently, in step S140, a process of classifying the points of the second object 23 into the points of the candidate static object and the points of the candidate dynamic object 28 on the basis of the velocity model of the static object 26 may be performed by the post-filter 226.

Subsequently, in step S150, a process of tracking the position value of the dynamic object at a current time on the basis of the points of the dynamic object 25 and the points of the candidate dynamic object 28 may be performed by the track module 230.

In an embodiment, the step S120 may include a process of classifying, into the points of the second object 23, points located in a previously set radius among points of the point cloud 20 with respect to the position value 21 of the dynamic object tracked at the previous time in the 3D space and classifying the other points into the points of the first object 22.

In an embodiment, the outlier filtering algorithm may include random sample consensus (RANSAC).

In an embodiment, the step S130 may further include a process of generating the velocity model of the static object 26, based on the points of the static object 24.

In an embodiment, the velocity model of the static object 26 may include a sinusoidal curve shown in a graph which includes an x axis representing an azimuth of the static object and a y axis representing a Doppler velocity of the static object.

In an embodiment, the step S140 may include a process of classifying points, fitted to a sinusoidal curve shown in the velocity model of the static object 26 among the points of the second object 23, into the points of the candidate static object 27 and a process of classifying points, which are not fitted to a sinusoidal curve among the points of the second object 23, into the points of the candidate dynamic object 28.

In an embodiment, the step S150 may include a process of clustering the points of the dynamic object 25 and the points of the candidate dynamic object 28, based on a clustering algorithm, and recognizing the clustered points as the dynamic object by using the clustering unit 232 of the track module 230 and a process of tracking the recognized position value of the dynamic object at the current time, based on the Gaussian mixture model corresponding to the recognized dynamic object.

In an embodiment, the clustering algorithm may be, for example, density-based spatial clustering of applications with noise (DBSCAN).

In an embodiment, the step S150 may include a process of expressing the clustered points as the Gaussian mixture model, a process of performing a pruning process and a removing process on the clustered points expressed as the Gaussian mixture model and may perform to remove noise, a process of calculating a probability hypothesis density by using a mixture of Gaussian components of the clustered points from which the noise has been removed, and a process of estimating the position value of the dynamic object at the current time, based on the calculated probability hypothesis density.

In an embodiment, the filter 234 may be a Gaussian mixture probabilistic hypothesis density (GMPHD) filter.

In an embodiment, after the step S150, the ego-motion estimation apparatus 300 may further perform a process of estimating an ego-motion including the Doppler velocity and the heading angle of the radar sensor, based on the points of the static object 24 and the points of the candidate static object 27.

According to the embodiments of the present invention, unlike a conventional method which estimates an ego-motion of a radar sensor by filtering a dynamic object with only an outlier filtering algorithm (RANSAC) so as to increase a static object recognition rate, because a dynamic object is filtered by adding pre-filtering and post-filtering in addition to RANSAC, a static object may be robustly recognized. Accordingly, an ego-motion of a radar sensor may be accurately estimated even in an environment where a ratio occupied by a dynamic object is higher than a ratio occupied by a static object.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of filtering dynamic objects in radar-based ego-motion estimation, the method comprising:

converting a measurement value at a current time, measured by a radar sensor, into a point cloud by using a data converter;

classifying the point cloud into points of a first object predicted as a static object and points of a second object predicted as a dynamic object by using a pre-filter, based on a position value of a dynamic object tracked at a previous time by a track module;

classifying the points of the first object into the points of the static object predicted as a normal value and the points of the dynamic object predicted as an outlier by using an outlier filter, based on an outlier filtering algorithm;

classifying the points of the second object into points of a candidate static object and points of a candidate dynamic object by using a post-filter, based on a velocity model of the static object; and tracking the position value of the dynamic object at the current time by using the track module, based on the points of the dynamic object and the points of the candidate dynamic object, wherein the tracking of the position value of the dynamic object comprises:

clustering the points of the dynamic object and the points of the candidate dynamic object, based on a clustering algorithm, and recognizing the clustered points as the dynamic object by using a clustering unit of the track module; and tracking the recognized position value of the dynamic object at the current time by using a filter of the track module, based on a Gaussian mixture model corresponding to the recognized dynamic object.

2. The method of claim 1, wherein the classifying of the point cloud comprises classifying, into the points of the second object, points located in a previously set radius among points of the point cloud with respect to the position value of the dynamic object tracked at the previous time in a three-dimensional space and classifying the other points into the points of the first object.

3. The method of claim 1, wherein the outlier filtering algorithm comprises random sample consensus (RANSAC).

4. The method of claim 1, wherein the classifying of the points of the first object comprises generating the velocity model of the static object, based on the points of the static object, and the velocity model of the static object comprises a sinusoidal curve shown in a graph which includes an x axis representing an azimuth of the static object and a y axis representing a Doppler velocity of the static object.

5. The method of claim 1, wherein the classifying of the points of the second object comprises:

classifying points, fitted to a sinusoidal curve shown in the velocity model of the static object among the points of the second object, into the points of the candidate static object; and classifying points, which are not fitted to the sinusoidal curve among the points of the second object, into the points of the candidate dynamic object.

6. The method of claim 1, wherein the clustering algorithm comprises density-based spatial clustering of applications with noise (DBSCAN).

7. The method of claim 1, wherein the tracking of the position value of the dynamic object at the current time comprises:

expressing the clustered points as the Gaussian mixture model;

performing a pruning process and a removing process on the clustered points expressed as the Gaussian mixture model to remove noise;

calculating a probability hypothesis density by using a mixture of Gaussian components of the clustered points from which the noise has been removed; and estimating the position value of the dynamic object at the current time, based on the calculated probability hypothesis density.

8. The method of claim 1, wherein the filter of the track module comprises a Gaussian mixture probabilistic hypothesis density (GMPHD) filter.

9. The method of claim 1, further comprising estimating an ego-motion including a Doppler velocity and a heading angle of the radar sensor, based on the points of the static object and the points of the candidate static object.

10. An apparatus for filtering dynamic objects in radar-based ego-motion estimation, the apparatus comprising:

a data converter configured to convert a measurement value at a current time, measured by a radar sensor, into a point cloud;

a pre-filter configured to classify the point cloud into points of a first object predicted as a static object and points of a second object predicted as a dynamic object, based on a position value of a dynamic object tracked at a previous time by a track module;

an outlier filter configured to classify the points of the first object into the points of the static object predicted as a normal value and the points of the dynamic object predicted as an outlier, based on an outlier filtering algorithm;

a post-filter configured to classify the points of the second object into points of a candidate static object and points of a candidate dynamic object, based on a velocity model of the static object; and the track module configured to track the position value of the dynamic object at the current time, based on the points of the dynamic object and the points of the candidate dynamic object, wherein the track module comprises:

a clustering unit configured to cluster the points of the dynamic object and the points of the candidate dynamic object, based on a clustering algorithm, and recognize the clustered points as the dynamic object; and a filter configured to track the recognized position value of the dynamic object at the current time, based on a Gaussian mixture model corresponding to the recognized dynamic object.

11. The apparatus of claim 10, wherein the pre-filter classifies, into the points of the second object, points located in a previously set radius among points of the point cloud with respect to the position value of the dynamic object tracked at the previous time in a three-dimensional space and classifies the other points into the points of the first object.

12. The apparatus of claim 10, wherein the outlier filtering algorithm comprises random sample consensus (RANSAC).

13. The apparatus of claim 10, wherein the outlier filter generates the velocity model of the static object, based on the points of the static object, and the velocity model of the static object comprises a sinusoidal curve shown in a graph which includes an x axis representing an azimuth of the static object and a y axis representing a Doppler velocity of the static object.

14. The apparatus of claim 10, wherein the post-filter classifies points, fitted to a sinusoidal curve shown in the velocity model of the static object among the points of the second object, into the points of the candidate static object and classifies points, which are not fitted to the sinusoidal curve among the points of the second object, into the points of the candidate dynamic object.

15. The apparatus of claim 10, wherein the clustering algorithm comprises density-based spatial clustering of applications with noise (DBSCAN).

16. The apparatus of claim 10, wherein the filter comprises a Gaussian mixture probabilistic hypothesis density (GMPHD) filter.

* * * * *